US009443632B2

(12) United States Patent
Wereley et al.

(10) Patent No.: US 9,443,632 B2
(45) Date of Patent: Sep. 13, 2016

(54) HYBRID DEVICE FOR ON-CHIP CONCENTRATION, MANIPULATION, SORTING AND SENSING OF PARTICLES ON A PLASMONIC SUBSTRATE

(71) Applicant: Purdue Research Foundation, West Lafayette, IN (US)

(72) Inventors: Steven Wereley, West Lafayette, IN (US); Agbai A Nnanna, Crown Point, IN (US); Alexandra Boltasseva, West Lafayette, IN (US); Justus C Ndukaife, Hammond, IN (US); Avanish Mishra, West Lafayette, IN (US)

(73) Assignee: PURDUE RESEARCH FOUNDATION, West Lafayette, IN (US)

( * ) Notice: Subject to any disclaimer, the term of this patent is extended or adjusted under 35 U.S.C. 154(b) by 0 days.

(21) Appl. No.: 14/732,673

(22) Filed: Jun. 6, 2015

(65) Prior Publication Data
US 2015/0380120 A1    Dec. 31, 2015

Related U.S. Application Data

(60) Provisional application No. 62/008,288, filed on Jun. 5, 2014, provisional application No. 62/014,197, filed on Jun. 19, 2014.

(51) Int. Cl.
*G21K 5/04*       (2006.01)
*G21K 1/00*       (2006.01)
*G02B 5/00*       (2006.01)

(52) U.S. Cl.
CPC .............. *G21K 1/006* (2013.01); *G02B 5/008* (2013.01)

(58) Field of Classification Search
USPC .................................. 250/251, 491.1, 492.1
See application file for complete search history.

(56) References Cited

U.S. PATENT DOCUMENTS

| 2007/0242105 | A1* | 10/2007 | Srinivasan | B01F 13/0071 347/63 |
| 2012/0069331 | A1* | 3/2012 | Shopova | G01N 21/7746 356/301 |
| 2012/0161600 | A1* | 6/2012 | Norris | B81C 99/009 313/11 |
| 2014/0358128 | A1* | 12/2014 | Montazeri | H01L 31/054 604/890.1 |

OTHER PUBLICATIONS

Ndukaife, J., et al., Photothermal Heating Enabled by Plasmonic Nanostructures for Electrokinetic Manipulation and Sorting of Particles. ACS NANO, 2014, vol. 8, No. 9, 9035-9043.
Ndukaife, J., et al., Photothermal heating enabled by plasmonic nanoantennas for electrokinetic manipulation and sorting of submicron particles. CLEO: 2014, OSA Technical Digest (online) paper FTh1K.2.

* cited by examiner

*Primary Examiner* — Nicole Ippolito
(74) *Attorney, Agent, or Firm* — Purdue Research Foundation

(57) ABSTRACT

The present disclosure relates generally to plasmonic substrates and specifically to high-throughput trapping of particles on a plasmonic substrate.

20 Claims, 9 Drawing Sheets

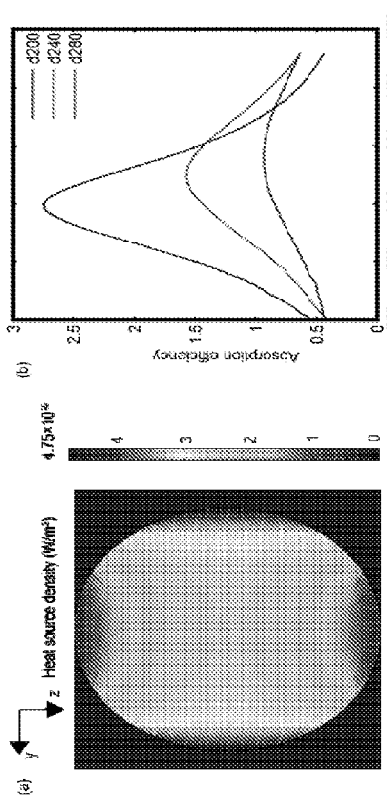
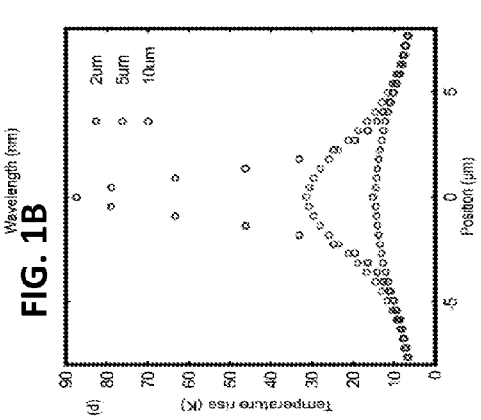
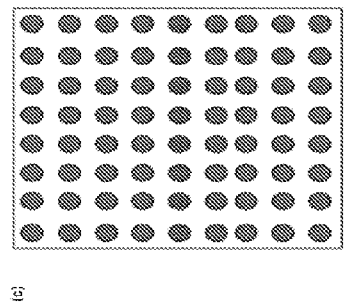
FIG. 1A
FIG. 1B
FIG. 1C
FIG. 1D

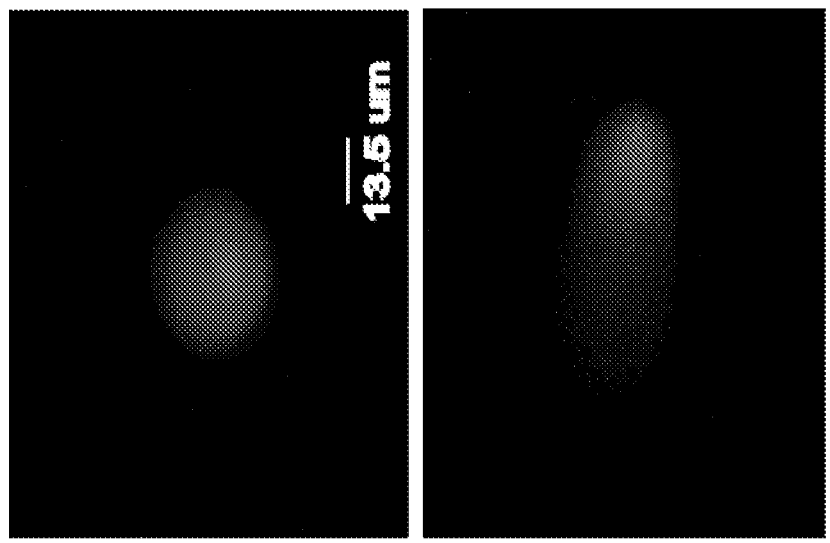

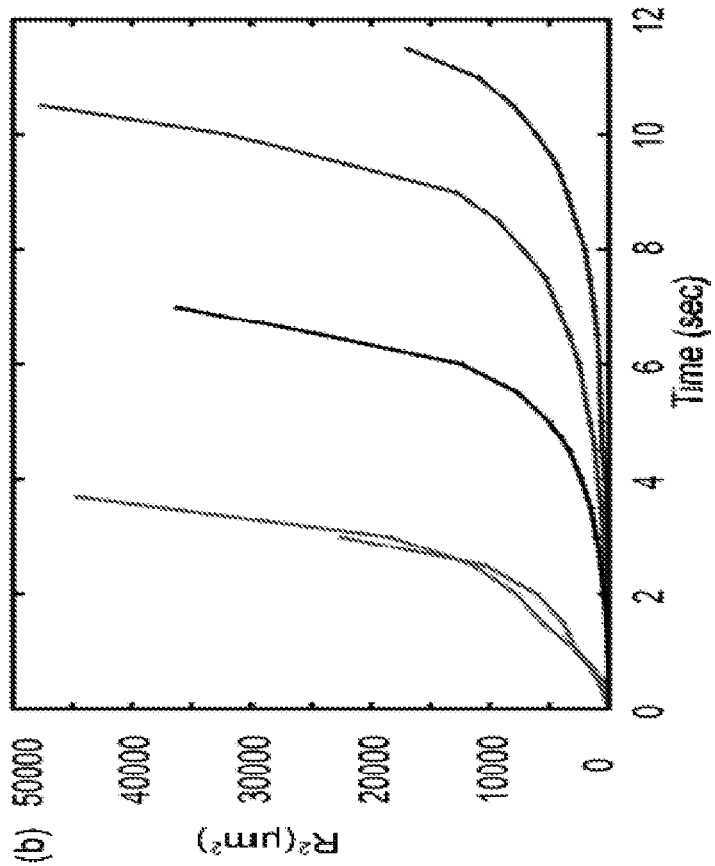
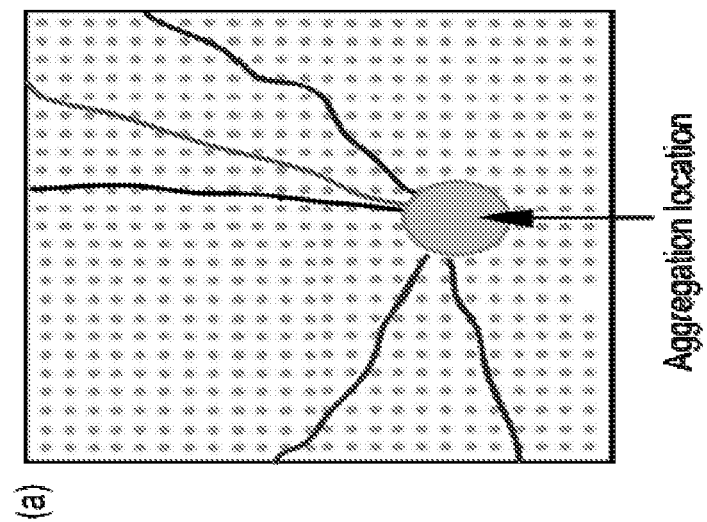
FIG. 7B
FIG. 7A

HYBRID DEVICE FOR ON-CHIP CONCENTRATION, MANIPULATION, SORTING AND SENSING OF PARTICLES ON A PLASMONIC SUBSTRATE

GOVERNMENT RIGHTS

This invention was made with government support under DMR1120923 awarded by the National Science Foundation. The government has certain rights in the invention.

BACKGROUND

1. Field of Disclosure

The present disclosure relates generally to plasmonic substrates and specifically to high-throughput trapping of particles on a plasmonic substrate.

2. Related Art

The ability to trap particles by light using optical tweezers generated lots of interest within the past four decades. In an optical tweezer, a tightly focused laser beam is used to create strong optical gradient forces for confining micro-particles. Because of the diffraction limit, light can only be focused down to about half the wavelength in the medium, thus setting a limit on maximum achievable optical gradient force from laser power. Since the trapping force scales as the particle radius to third power (in the quasi-static limit), and coupled with increased Brownian motion it becomes difficult to address submicron and nanoscale objects with optical tweezers. As a result, plasmonic trapping is now actively investigated to overcome the limitations of optical tweezers.

In conventional plasmonic trapping also known as plasmonic nanotweezer, the local field enhancement around a local localized surface plasmon resonance (LSPR) supporting nanostructure, generated via resonant coupling of incident photons with free electrons on metallic nanostructures, is used to achieve sub-wavelength electromagnetic field confinement. This field highly confined to the surface of the nanostructures creates strong optical gradient forces, thus offering a route for trapping submicron and nanoscale particles. Additionally, the highly localized and enhanced electromagnetic field also known as 'optical hot spots' can be engineered to create arbitrary optical trapping potential wells for confining particles. However, the excitation of localized surface plasmonic resonance and hence local field enhancement is also accompanied by resonant light absorption, which results in local heat generation within the volume of the plasmonic nanostructures.

In the context of plasmonic trapping, generally, the focus is on the enhanced local fields, while little attention is paid to the associated local heat generation or thermal hot spots. This local heating effect has been seen as an obstacle to stable trapping of particles on a plasmonic substrate because of heating induced thermophoresis and even boiling, which obscures the trapping process. Hence efforts have been made to suppress this heating effect such as integrating a heat sink to dissipate excess heat, and off-resonance excitation to minimize light absorption. However the emerging field of thermoplasmonics has identified the unique attribute of this heating effect in realization of nanoscale heat sources that can be remotely controlled and switched by light.

Several applications harnessing this effect and being explored include plasmonic photothermal therapy for destruction of tumor cells, photothermal imaging, and solar powered steam generation. Similar to the above-mentioned applications which rely on local heating effect enabled by resonantly excited plasmonic nanoparticles, this intrinsic heating effect could be harnessed for trapping, concentration, manipulation and sorting of micro and nanoscale particles on a plasmonic substrate. Additionally, it is important to emphasize that suppressing the heating effect leaves only the enhanced electromagnetic local field as the only photo-induced signal present, and this presents some practical challenges for plasmonic nanotweezers.

First because the enhanced electromagnetic fields or optical hot spots exist in the near-field, they produce short-range interactions. Thus, the force field due to the optical hot spots can only be felt by an object after it has diffused several nanometers close to the resonant nanostructure, where it can interact with the force field from the enhanced local field. Because the object is transported via Brownian motion, the process is inherently slow. Thus only particles sufficiently close to the resonantly excited nanostructures can be trapped in a reasonable time frame.

In addition, because the field is confined to the nanostructures, manipulating the laser source from one point to another effectively switches off the optical hot spots at the initial location and switches it on at another location. Now, if the separation between the plasmonic nanostructures (i.e. the trapping sites) is large such that near-field electromagnetic coupling is absent, then a trapped object cannot be manipulated by optical gradient forces (from near-field enhancement), as these are short-range interactions. Hence, transport of target particles over long distances, which is critical for varieties of Lab-on-a-chip application such as on-chip sorting, has not been shown using plasmonic nanotweezers. These important issues suggest that there is a need for further advancement of plasmonic nanotweezer design. These issues limit the applicability of plasmonic tweezers for various lab-on-a-chip applications such as biosensing, where the rapid delivery of analytes such as bio-particles is critical to improve plasmonic biosensor response time. As a result, efforts are now being made to address the limitations of current plasmonic nanotweezers.

It is important to emphasize that the use of a plasmonic substrate for particle trapping opens up additional applications beyond trapping of submicron and nanoscale particles by taking advantage of the high photonic density of states generated when excited at plasmonic resonance. These include biosensing (for example via LSPR resonance shifts) surface enhanced spectroscopies, as well as enhancing the radiative properties of emitters. In biosensors, for example, rapid transport, and concentration of analytes is critical for reducing the detection time as well as improving the detection limit. Hence the ability to rapidly manipulate, and sort micro and nanoparticles on a plasmonic nanostructured substrate would greatly enable several lab-on-a chip applications with plasmonic nanostructures.

However, these applications have been hampered so far because of the diffusion-limited transport of particles to the trapping sites. Rather embodiments of the present disclosure take advantage of the intrinsic heating effects from photo-induced heating of a plasmonic nanoparticle array, instead of suppressing them, to address the issue of dynamic transport of dielectric particles over long distances on plasmonic nanostructures. Embodiments of the present disclosure demonstrate rapid particle transport, high throughput concentration, dynamic manipulation, and sorting of micro and nanoscale particles on a plasmonic nanostructured substrate, by harnessing collective heating effect of arrays of plasmonic nanostructures on a substrate. Embodiments of the present disclosure synergize localized surface plasmon resonance with an optically-induced electrokinetic phenomenon known as Rapid Electrokinetic Patterning (REP).

In Rapid Electrokinetic Patterning, a tightly focused laser beam is used to heat an electrode surface made of a thin absorbing film such as ITO coating on a glass substrate. The absorbed energy dissipated into heat is transferred to the adjoining fluid medium and creates conductivity and permittivity gradients. With the application of an AC electric field, an electrothermal body force is generated in the fluid. The electrothermal force captures suspended particles in the fluid and rapidly transports them to the electrode surface. For external AC frequencies below a certain critical frequency, particles brought close to the electrode surface are captured by low frequency electrokinetic forces. Typical laser intensity used for REP is on the order of $10^{10}$ W/m$^2$. Embodiments of the present disclosure have replaced a thin film substrate with plasmonic resonant nanostructures and for the first time harnessed the collective heating of many nanoparticles to achieve better heating efficiency at reduced laser power and focusing. Because the plasmonic nanostructures enable nanoscale heat confinement within the particles, better heat confinement is achieved with minimal thermal spreading.

The use of plasmonic nanostructured substrates presents two main advantages. First, better heating can be obtained with resonantly excited nanoparticle array due to the combined action of large absorption efficiency and collective contribution of many thermally interacting nanoparticles. This makes it possible to induce stronger electrothermal vortices for particle transport at reduced illumination intensity in comparison with use of a thin film substrate (an important factor for handling biological organisms). Second, illumination of the plasmonic nanostructures also results in creation of optical hot spots or localized surface plasmons, which could be employed for surface enhanced spectroscopies, biosensing and engineering the photonic density of states of quantum emitters such as nitrogen-vacancy centers in nanodiamonds.

SUMMARY OF THE INVENTION

In one aspect of the present invention there is provided a hybrid device for on-chip concentration of particles on a plasmonic substrate, wherein the plasmonic substrate may comprise a first substrate with a bottom portion coupled to a bottom portion of a microfluidic chamber that includes a fluidic medium, wherein the fluidic medium is configured to transport a plurality of particles located in the fluidic medium when an electrothermal force is generated within the fluidic medium. It may further comprise a second substrate with a bottom portion coupled to a top portion of the first substrate opposing the bottom portion of the first substrate that is non-uniform to generate a thermal gradient, wherein the thermal gradient is configured to generate the electrothermal force within the fluidic medium and a third substrate with a bottom portion coupled to a top portion of the second substrate opposing the bottom portion of the second substrate and a top portion that includes an electrode that is configured to receive a laser beam that heats the electrode, wherein the heated electrode generates the thermal gradient in the second substrate that generates the electrothermal force within the fluidic medium to direct particles onto the plasmonic substrate.

In another aspect of the present invention there is provided a method for on-chip concentration of particles on a plasmonic substrate, wherein the method may comprise the steps of coupling a bottom portion of a first substrate to a bottom portion of a fluidic chamber that includes a fluidic medium; transporting a plurality of particles located in the fluidic medium when an electrothermal force is generated within the fluidic medium; coupling a bottom portion of a second substrate to a top portion of the first substrate opposing the bottom portion of the first substrate that is non-uniform to generate a thermal gradient; generating the thermal gradient to generate the electrothermal force within the fluidic medium; coupling a bottom portion of a third substrate to a top portion of the second substrate opposing the bottom portion of the second substrate, wherein a top portion of the third substrate includes an electrode; receiving a laser beam by the top portion of the third substrate that includes the electrode; and generating the thermal gradient in the second substrate from the heated electrode that generates the electrothermal force within the fluidic medium to direct particles onto the plasmonic substrate.

BRIEF DESCRIPTION OF THE DRAWINGS/FIGURES

Embodiments of the present disclosure are described with reference to the accompanying drawings. In the drawings, like reference numerals indicate identical or functionally similar elements. Additionally, the left most digit(s) of a reference number identifies the drawing in which the reference number first appears.

FIG. 1A illustrates power dissipation density for a gold nanodisk of 240 nm diameter according to one exemplary embodiment of the present disclosure;

FIG. 1B illustrates absorption efficiency for 200 nm, 240 nm, and 280 nm gold nanodisks according to one exemplary embodiment of the present disclosure;

FIG. 1C illustrates the line section along the middle section of the array with red particles that depict the nanoparticles whose surface temperatures were calculated while taking into account all other photo-stimulated particles in the square array according to one exemplary embodiment of the present disclosure;

FIG. 1D illustrates the temperature on the surface of gold nanodisks taken along the line depicted in FIG. 1C for beam focused to 10, 5, and 2 µm FWHM respectively according to one exemplary embodiment of the present disclosure;

FIG. 4A illustrates initial capture of 1 µm particles on the PNS according to one exemplary embodiment of the present disclosure;

FIG. 4B illustrates moving the stage that translates the particle cluster to a new location according to one exemplary embodiment of the present disclosure;

Figure 5B:
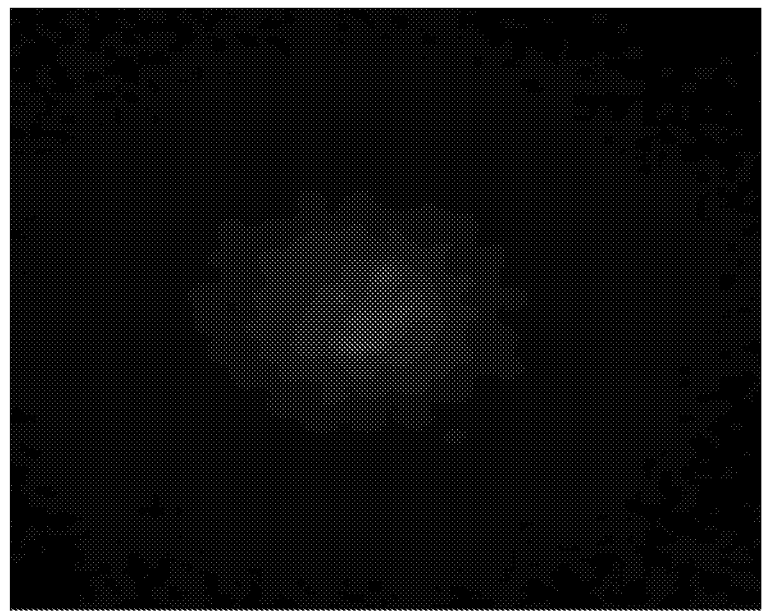
FIG. 5A illustrates separation of 1 µm from 2 µm particles where both particles were initially captured at 10 kHz frequency according to one exemplary embodiment of the present disclosure.
Figure 6:
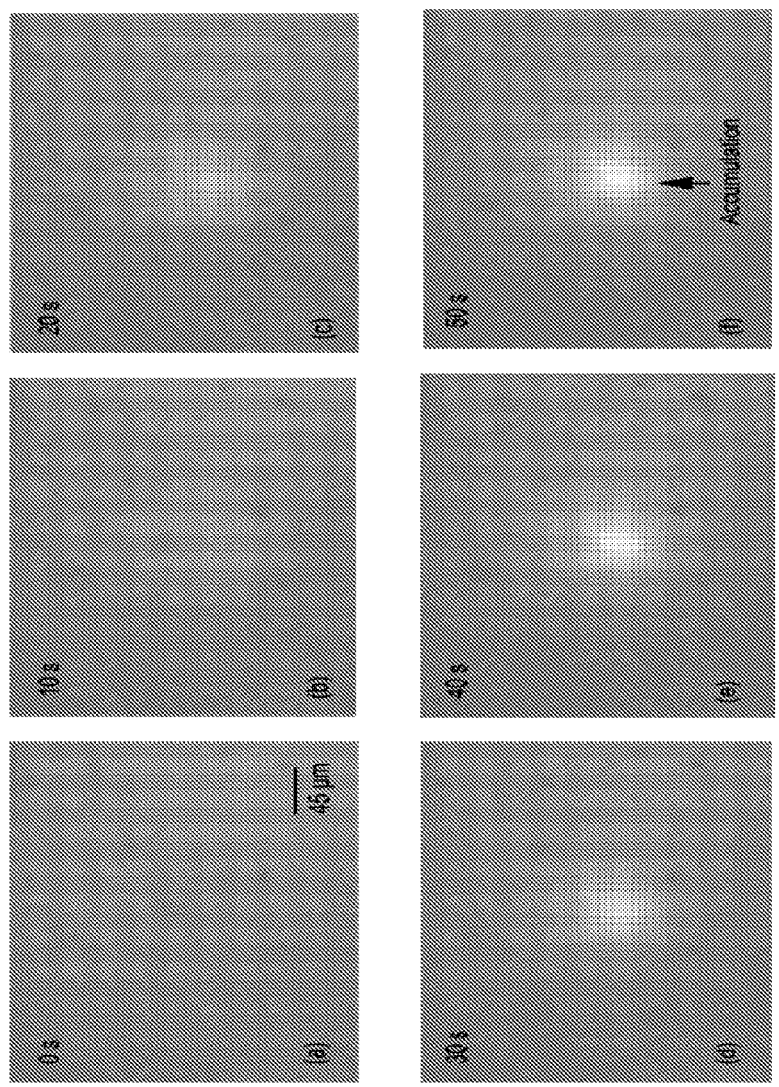
Figure 8:
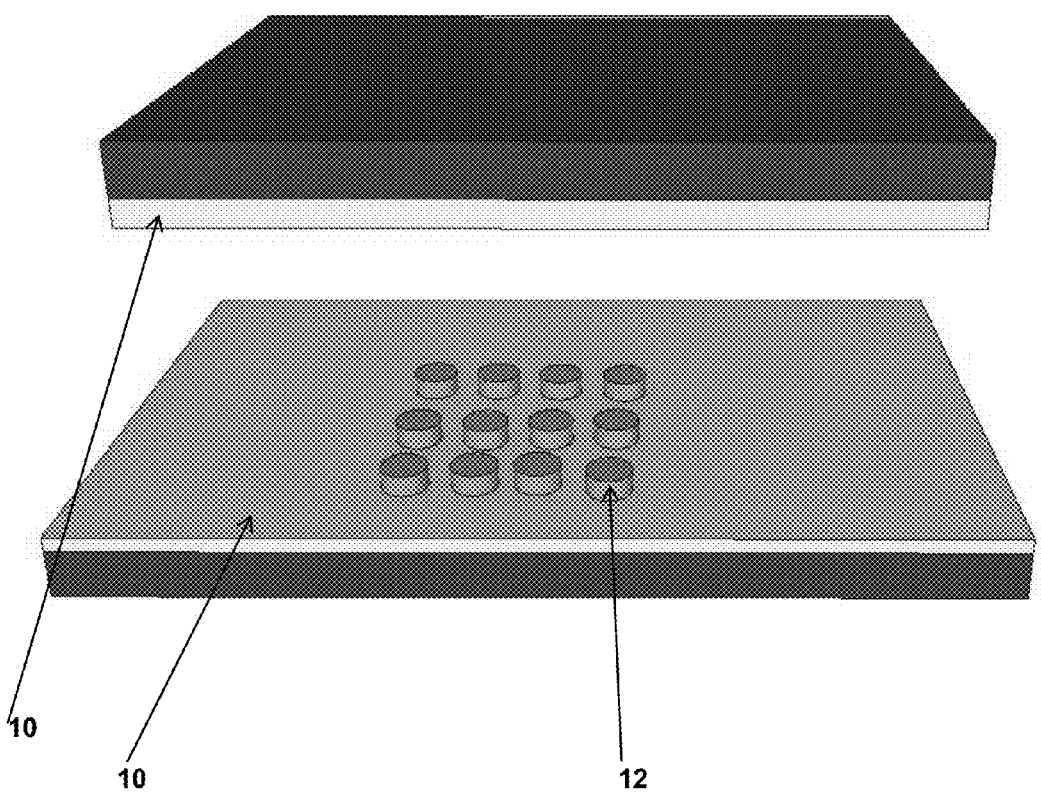
Figure 9A:
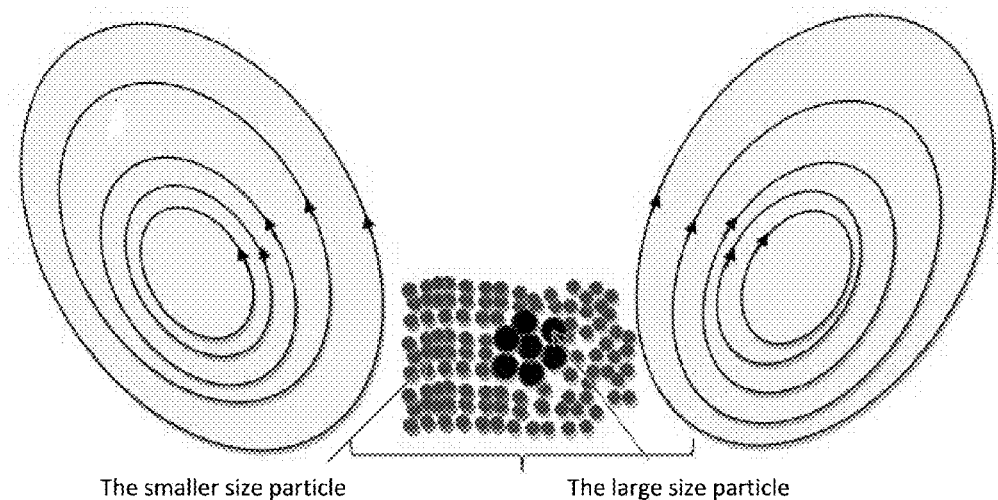
Figure 9B:
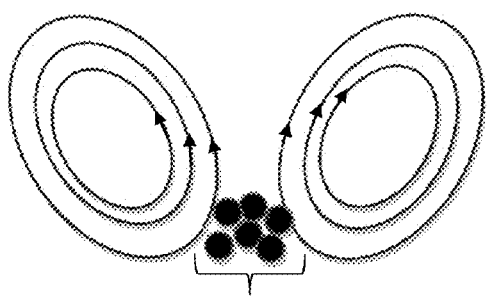

FIG. 5B illustrates separation of 1 µm from 2 µm particles at 25 kHz frequency, with only the 1 µm particles remain captured, while the 2 µm particles are expelled from the trap according to one exemplary embodiment of the present disclosure;

FIG. 6 illustrates concentration of 100 nm polystyrene particles on the PNS, when 17 mW laser and 19 Vpp AC electric field of the 50 kHz frequency were applied with each frame (a) through (f) showing the evolution of aggregation with time according to one exemplary embodiment of the present disclosure;

FIG. 7A illustrates a schematic showing the trajectories of five different 1 µm particles captured and being transported by plasmonically-enhanced microfluidic vortices towards the aggregation site according to one exemplary embodiment of the present disclosure;

FIG. 7B illustrates the square of distance travelled with time as the particles arrive at the trapping site according to one exemplary embodiment of the disclosure;

FIG. 8 illustrates the hybrid device for dynamic manipulation of particles on a plasmonic nanostructured substrate according to one exemplary embodiment of the present disclosure;

FIG. 9A illustrates two-way particle sorting when both laser and an AC field are turned on according to one exemplary embodiment of the present invention; and FIG. 9B illustrates particle sorting in contrast to FIG. 9A when the laser is on and the AC field is turned off according to one exemplary embodiment of the present invention.

The present disclosure will now be described with reference to the accompanying drawings. In the drawings, like reference numbers generally indicate identical, functionally similar, and/or structurally similar elements. The drawings in which an element first appears is generally indicated by the leftmost digit(s) in the reference number.

DETAILED DESCRIPTION OF THE PRESENT DISCLOSURE

The following Detailed Description refers to accompanying drawings to illustrate exemplary embodiments consistent with the present disclosure. References in the Detailed Description to "one exemplary embodiment," "an exemplary embodiment," an "example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic may be described in connection with an exemplary embodiment, it is within the knowledge of those skilled in the art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the present disclosure. Therefore, the Detailed Description is not meant to limit the present disclosure. Rather, the scope of the present disclosure is defined only in accordance with the following claims and their equivalents.

Embodiments of the present disclosure may be implemented in hardware, firmware, software, or any combination thereof. Embodiments of the present disclosure may also be implemented as instructions supplied by a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical optical, acoustical or other forms of propagated signals (e.g., carrier waves, infrared signals, digital signals, etc.), and others. Further firmware, software routines, and instructions may be described herein as performing certain actions. However, it should be appreciated that such descriptions are merely for convenience and that such actions in fact result from computing devices, processors, controllers, or other devices executing the firmware, software, routines, instructions, etc.

For purposes of this discussion, each of the various components discussed may be considered a module, and the term "module" shall be understood to include at least one of software, firmware, and hardware (such as one or more circuit, microchip, or device, or any combination thereof), and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the present disclosure that others can, by applying knowledge of those skilled in the relevant art(s), readily modify and/or adapt for various applications such exemplary embodiments, without undue experimentation, without departing from the spirit and scope of the present disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Plasmonic nanostructures support strong electromagnetic field enhancement or optical "hot spots" that can be used for trapping of submicron and nanoscale objects. The generation of these optical hot spots is accompanied by local heat generation. This heating effect has been generally seen as an obstacle to stable trapping of particles on a plasmonic substrate. An embodiment of the present disclosure includes high-throughput trapping of particles on a plasmonic nanostructured substrate by taking advantage of the collective photo-induced heating of the nanoantenna array. The photo-induced heating of the nanostructures is combined with external AC signal of less than 100 KHz, which results in creation of strong microfluidic vortices. The vortices rapidly transport suspended particles towards the plasmonic nanoantennas where they aggregate.

Figure 3:
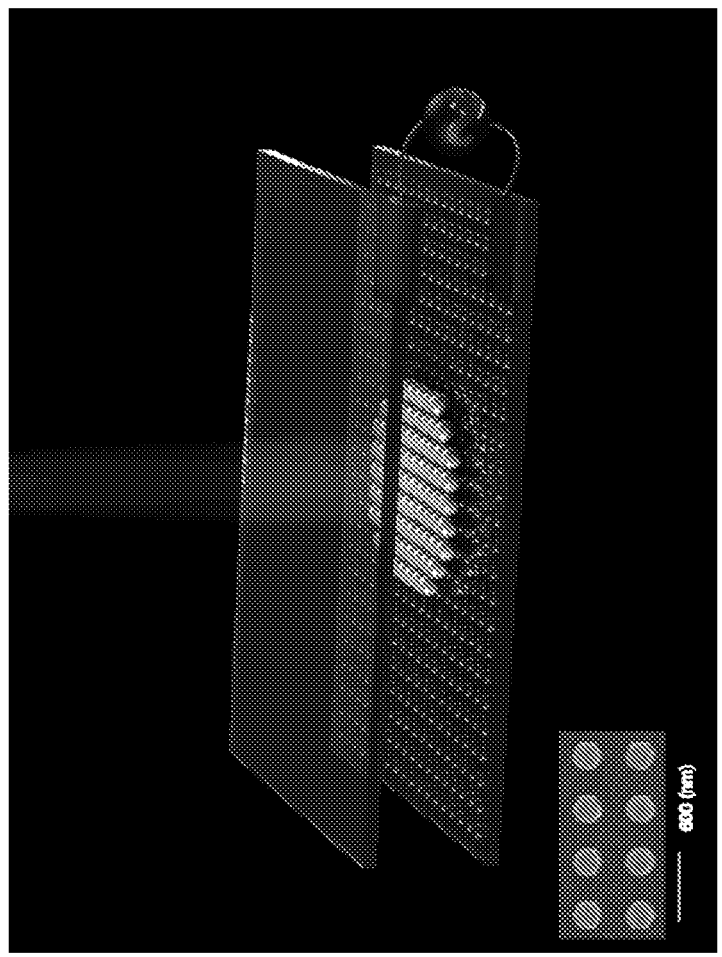
FIG. 3 illustrates the hybrid device for dynamic manipulation of particles on a plasmonic nanostructured substrate according to one exemplary embodiment of the present disclosure.

Exemplary embodiments of a hybrid device for on-chip concentration of particles on a plasmonic substrate comprising plasmonic nanostructures of the present invention are shown in FIG. 3 and FIG. 8. As shown in FIG. 8, the plasmonic nanostructures 12 may be positioned on an electrically conducting layer 10. The plasmonic nanostructures may be comprised of materials such as, but not limited to, gold, silver or transition metal nitrides. In an alternative embodiment, there may be a dielectric space layer positioned between electrically conducting layer 10 and plasmonic nanostructures 12.

Plasmonically-Enhanced Electrothermal Microfluidic Vortices

Embodiments of the present disclosure involving a plasmonic nanostructured substrate does not rely on field enhancement but instead on collective heating from the resonantly excited nanoparticle array to achieve rapid particle manipulation, concentration and sorting. The plasmonic nanostructure array was designed for enhanced absorption efficiency at near infrared illumination laser line of 1064 nm. Rapid particle transport is achieved by inducing electrothermal body forces in the fluid. Electrothermal vortices can be optically induced by photo-induced heating and applying an external AC electric field. The heating of a fluid medium creates gradient in permittivity and conductivity of the fluid. For the case of an electrode with thin absorbing film, temperature gradients are obtained by tightly focused illumination. The application of AC electric field establishes a body force on the fluid known as an electrothermal body force. The expression for the average electrothermal body force per unit volume as presented by Green and co-workers is given by:

$$\langle f_{ethm} \rangle = \frac{1}{2} Re \left[ \frac{\sigma \in (\alpha - \beta)}{\sigma + i\omega \in} (\nabla T \cdot E) E^* - \frac{1}{2} \in \alpha |E|^2 \nabla T \right] \quad (1)$$

where $\alpha = (1/\in)(\partial \in /\partial T)$ and $\beta = (1/\sigma)(\partial \sigma /\partial T)$, $\sigma$ and $\in$ are the conductivity and permittivity of the fluid respectively at the frequency $\omega$, E and $\nabla T$ are the applied electric field and temperature gradient respectively.

Photo-induced heating of resonantly excited plasmonic nanoantennas would also result in heating of the surrounding fluid medium, establishing gradients in permittivity and conductivity. By applying an AC electric field, electrothermal vortices can be generated to assist in particle transport. According to the expression above, the electrothermal body force is contingent on temperature gradient, i.e. the localization of temperature field in space, hence the need for tightly focused illumination in prior REP demonstration.

On the other hand, metallic nanostructures have been shown to enable dramatic local heating efficiency, when excited at resonance and present a way to realize nanoscale heat sources remotely controllable by light. Thus, by using a plasmonic nanostructured substrate, enhanced heating efficiency, and higher temperature gradients could be achieved for the same illumination condition. This is so because arrays of optically-stimulated plasmonic nanostructures can produce larger temperature rise via collective effects. Since the electrothermal effect requires non-uniform heating of the surrounding fluid to create temperature gradients, it is important to determine the temperature profile on the surfaces of plasmonic nanostructure array with many thermally interacting particles. For plasmonic nanoparticle illuminated with monochromatic light, the heat power absorbed and delivered by each nanoparticle j is given by:

$$Q_j = \frac{C_{abs} n \varepsilon_0 c}{2} |E_j^{ext}|^2 \quad (2)$$

where $C_{abs}$ is the absorption cross-section of the particle, n is the refractive index of the medium, and $|E_j^{ext}|^2$ is the external electric field experienced by the nanoparticle.

The heat power delivered is then $Q_j = C_{abs} I$, where I is the intensity of the incident light and given by:

$$I = \frac{n \varepsilon_0 c}{2} |E_{inc}^{ext}|^2.$$

For a Gaussian illumination, the irradiance is dependent on position and in radial coordinates is given by:

$$I(r) = \frac{P}{2\pi\sigma^2} e^{-\frac{r^2}{2\sigma^2}}. \quad (3)$$

where P is the laser power and $\sigma$ is related to the full-width at half maximum (FWHM) of the laser beam by: $FHWM = 2\sqrt{2\ln 2}\sigma$. Thus under Gaussian illumination, the heat power absorbed and delivered by the plasmonic nanostructures is also a function of radial coordinate. Alternatively, the illumination source may be a broadband illumination source with a circular profile profile, whereby a plurality of nanostructures are arranged to absorb the arbitrary illumination source and generate any desired temperature profile on the surface.

The thermal landscape on the plasmonic nanostructure array may be optimized such that induced thermophoretic and buoyancy-driven convection drag would act on the suspended particles to agglomerate them on the surface of the plasmonic nanoantennas. When the AC electric field is applied, electrothermal flow will also be induced to enable long-range particle capture and high throughput concentration on the surface of the plasmonic nanostructures. So this way the present invention would have two trapping potential wells superimposed on one another for high throughput particle concentration. Please note that when both AC field (set to a certain trapping frequency) and laser illumination are applied, particles will be concentrated with high throughput. If the AC field is turned OFF, the particles within the buoyancy driven convection vortex stagnation zone will be trapped, while those outside this region will be expelled. Thus by proper thermal profiling trapping of particles with high throughput and semi-high throughput may be achieved.

The absorption cross-section $C_{abs}$ of a plasmonic nanoantenna was evaluated by integrating the total power dissipation density in the particle over the volume of the particle normalized by the incident intensity. This was numerically computed by finite element analysis software (COMSOL Multiphysics). Different sizes were simulated to optimize the absorption efficiency, and this was used as a figure of merit to determine the photothermal response of the nanostructures. FIG. 1B shows the absorption efficiency for gold nanodisk with diameters of 200 nm, 240 nm and 280 nm. For illumination at 1064 nm laser line, the 240 nm Au disk has the higher absorption efficiency. Thus, the 240 nm Au nanodisk array is expected to result in higher overall temperature rise. The heat power dissipation density in a 240 nm diameter gold nanodisk immersed in water and illuminated with a plane wave with electric field polarized in z direction is shown in FIG. 1A. Numerical evaluation of temperature rise due to many thermally interacting nanoparticles is computationally intensive. The temperature profile on plasmonic nanostructures in an ordered array (such as lithographically fabricated patterns) can be readily determined by taking into account the self-contribution from heat delivered by the nanoparticle plus the contribution from other nanoparticles in an array. That is by virtue of collective heating, for any particle j the temperature rise on the surface of the particle at steady state is $$\Delta T_j = \frac{Q_j}{4\pi k \beta r_{eq}} + \sum_{\substack{k=1 \\ k \neq j}}^{N} \frac{Q_k}{4\pi k |r_j - r_k|}. \quad (4)$$

The first term on the right is the temperature rise on the surface of particle j due to self-heat power delivered by particle j. Though the power dissipation density is non-uniform as shown in FIG. 1A above, the temperature is uniform on the surface as well as in the volume of the nanoparticle since the thermal conductivity of the plasmonic nanostructure (gold in this case, which is 317 W/m K for the bulk) is much higher than that of the substrate and surrounding medium. The second term on the right depicts the temperature rise at the location of particle j due to the heat delivered by the other N−1 particles located at a distance $|r_j - r_k|$ away, where k=1, 2, . . . N. The sum of these two gives the effective temperature rise on the surface of any given nanoparticle, taking into account the effects of nearby particles.

Embodiments of the present disclosure compute temperature rise on the surface of the nanodisks in the array by taking into account the collective contribution from all the stimulated nanoscale heat sources in order to understand the temperature profile along the array. For nanodisk with diameter D, and thickness d, $$\beta = \exp\left\{0.04 - 0.124 \ln\frac{D}{d} + 0.0677\left[\ln\frac{D}{d}\right]^2 - 0.00457\left[\ln\frac{D}{d}\right]^3\right\}. \quad (5)$$

$r_{eq}$ is the equivalent radius of a nanosphere, whose volume is equivalent to the volume of the nanodisk, and k is the average thermal conductivity of the substrate and surrounding fluid medium. The thermal conductivity of the ITO coating is taken as 10.2 W/mK, while that of the surrounding water medium was taken as 0.65 W/mK for the computations.

FIG. 1D shows the temperature distribution from a nano-plasmonic structure array of 240 nm gold nanodisks, for laser power of 15 mw and focused to a spot of 2, 5, and 10 μm calculated by using equation 4.

By defoccusing the beam from spot size of 2 μm to 10 μm, the intensity reduced by a factor of 25. However the maximum temperature rise decreased from 87K to 15K a factor of 5.8 only. This is because by defocusing the beam, more optically stimulated nanoscale heat sources are produced that helps to compensate for the decreased intensity. Thus, with a defocused beam it is still possible to induce strong electrothermal effect for rapid particle transport. Additionally, even with a defocused Gaussian illumination of 10 μm FWHM, the temperature gradient along the line depicted in FIG. 1C is approximately $10^6$K/m. The stimulation of the nanoparticle array with a Gaussian illumination assists in generating a non-uniform temperature profile along the array surface, which is necessary for non-uniform heating of the adjoining fluid layer to establish temperature gradients as well as gradients in permittivity and conductivity. With a circular beam, with uniform intensity distribution, such large temperature gradient along the array cannot be achieved for the same beam diameter as the Gaussian FWHM.

In a further aspect of the present invention, two way particle sorting could also be accomplished with the present invention. By two way particle sorting, it is meant that one could preferentially select either larger or smaller of two particles in a fluid system. The idea is that the AC field frequency could be set to some low frequency below the critical frequency for trapping the particles such that at this frequency, the particles in the fluid (both large and small) will be trapped as shown in FIG. 9A. More so the larger particle size will move to occupy the central portion of the cluster due to a stronger hydrodynamic drag on the larger particles compared to the smaller ones (FIG. 9A). Thus when the AC field is turned OFF, the trapping mediated by convection drag and thermophoretic force would still act to hold the larger particles within the central portion of the cluster, as shown in FIG. 9B. This way, the larger sized particles can be collected and concentrated from the mixture. In order to select the smaller sized particles, both laser illumination and AC field will be turned ON and the frequency set to be higher than the critical frequency for trapping the larger of the particles, but below the critical frequency for trapping the smaller particles. In this case, the larger sized particles will be expelled from the trap, while the smaller sized particles will remain trapped.

Experimental Illustration

Gold nanodisks of diameter 240 nm and lattice constant of 450 nm were fabricated on an ITO coated glass substrate using electron beam lithography. The ITO coating also serves as a conducting layer for application of external electrical signals. Tracer fluorescent polystyrene particles 1 μm in diameter were suspended in deionized water and manually injected into the chip. The plasmonic nanostructured substrate was illuminated with a 17 mW laser power focused with a 40× objective lens. An external AC signal of 9.8 Vpp at 100 KHz was then applied, and immediately strong microfluidic vortices of toroidal nature were generated due to electrothermal effect. The motion of the fluid in turn exerts a drag force on the suspended tracer particles, transporting them in the process. By virtue of equation 1 above, electrothermal fluid motion is possible only when both photo-induced heating of the nanoparticle array and electric field are simultaneously present. These plasmonically-enhanced electrothermal microfluidic vortices were characterized using micro-particle image velocimetry flow visualization technique. The microfluidic vortex is axis-symmetric as shown by the velocity vector in FIG. 2A obtained after PIV analysis of successive image frames. The vector plot shows that the vortex acts to transport suspended particles towards the central position of laser illumination.

A thin film of gold is deposited on a similar ITO-coated glass substrate and the same thickness of 30 nm as the plasmonic nanostructured substrate in order to compare the strength of the vortices for both systems under the same experimental conditions. PIV analysis of the image frames was performed and FIG. 2B shows the spatially averaged radial velocity versus radial position plot for both the PNS and an equivalent thin film substrate of same thickness for the same laser power and external AC voltage of 9.8 Vpp and 100 KHz frequency.

The plasmonic nanostructure provides a much stronger vortex in comparison, with a maximum velocity of 46 μm/s versus 10 μm/s for the thin film substrate of same thickness. The stronger vortex is attributed to the better photothermal heating by the PNS following the near-resonance excitation of the plasmonic nanostructures in the array. An additional possible factor is that the plasmonic nanostructures can achieve better heat localization since water in between the particles has a much lower thermal conductivity thus minimizing lateral thermal spreading along the array. On the other hand, since the thin film system is made of continuous gold film, which has high thermal conductivity, significant lateral heat conduction along the film would result in lower temperature gradient along the film. Thus, stronger vortex can be generated at reduced laser intensity with the PNS compared with the thin film substrate.

Figures 2A, 2B:
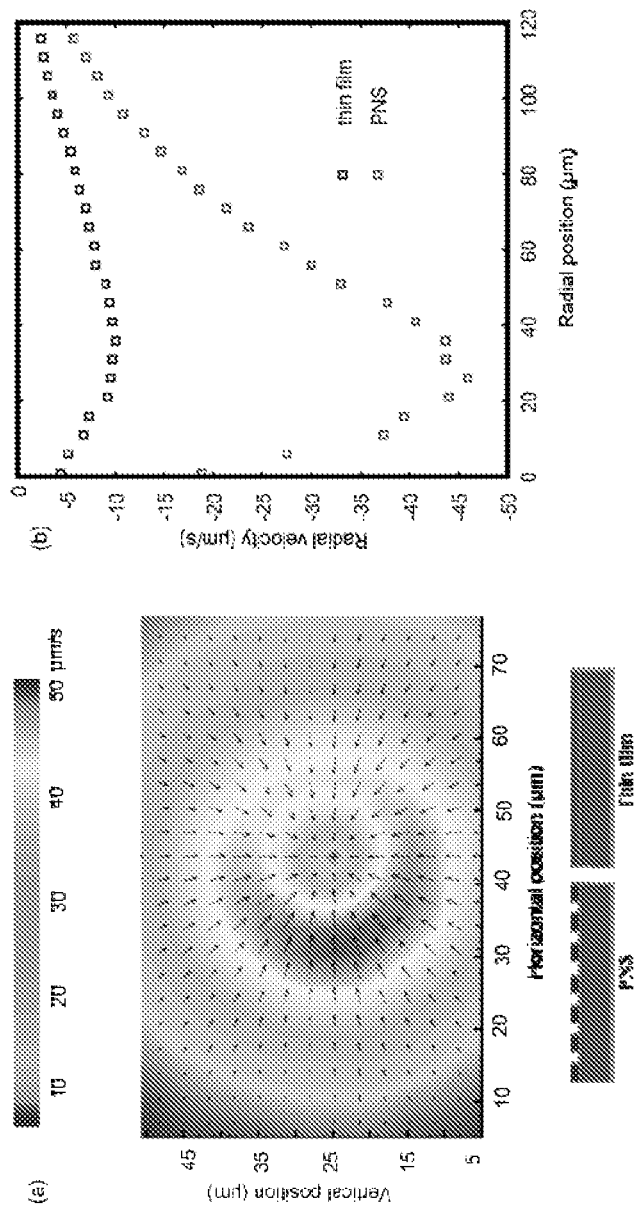
FIG. 2A illustrates the velocity distribution for ETH flow induced by the photo-induced heating of the plasmonic nanoparticle array, showing the axis-symmetric flow profile according to one exemplary embodiment of the present disclosure.
FIG. 2B illustrates the ETH vortex for a thin film substrate and a plasmonic nanostructured substrate for laser power and AC voltage of 9.8 Vpp and 100 kHz frequency according to one exemplary embodiment of the present disclosure.

FIG. 2B depicts that the vortex radial velocity from the PNS at a position 120 μm away is about 5.5 μm/s, and increases progressively towards the illumination center. This implies that particles located over 100 μm away could be captured by the vortex and rapidly accelerated towards the illuminated center. Thus, the plasmonically-enhanced electrothermal microfluidic vortices can serve to rapidly recruit particles from far locations towards the illuminated region. Since from equation 1 above, the electrothermal vortex depends on square of AC electric field, increasing the external voltage signal increases the strength of the vortex and even more rapid particle transport can be achieved.

Rather than employing convection as a means of fluid transport, plasmonically-enhanced electrothermal microfluidic vortices present a more efficient mechanism that inherently addresses the limitations of convection as outlined above. This is immediately observed by considering closed form expression of the physics of electrothermal body force per unit volume in equation 1 above, where to induce this force on the fluid requires the simultaneous generation of temperature gradient in the fluid (which can be achieved via photo-induced heating by the plasmonic nanoparticles), as well as an external AC electric field. Thus when external electric field is OFF, LSPR could be generated without fluid motion. This is highly attractive for a broad range of Lab-on-a-chip applications.

A laser power of 17 mW was applied through a 40×, 0.6 NA objective lens, but no particle aggregation was observed under this condition. An AC frequency at 50 KHz was applied with laser illumination of the plasmonic nanostructures, resulting in the generation of electrothermal vortices. The suspended 1 μm particles were continuously transported by the induced vortex, towards and away from the illuminated region, but no trapping took place. The AC frequency was reduced from 50 KHz to 25 KHz, and the suspended particles brought close to the plasmonic nanostructures were rapidly concentrated to form a large particle cluster as shown in FIG. 4A. Particle trapping was achieved at the center of the illuminated region because the applied AC frequency (25 KHz) was less than the critical frequency for trapping by low frequency electrokinetic forces. When the AC electric field was turned OFF, not only did the electrothermal motion cease, but in addition, the concentrated particle group was expelled from the illuminated region. The lack of particle trapping on turning OFF the external electric field is attributed to optically induced thermofluidic forces such as natural convection and thermophoresis that have been known to prevent stable trapping in plasmonic nanotweezers.

Figure 5A:
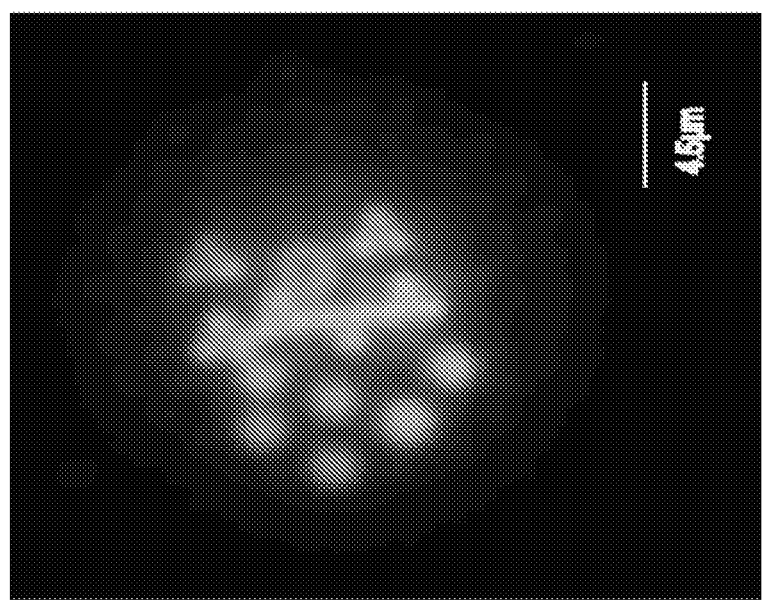

Dynamic manipulation of the collected particle group over the PNS was achieved by moving the microscope stage from one location to excite new thermal hot spots and hence electrothermal microfluidic vortices, which drag the particle group to the illuminated location (SI_video1). FIG. 4 shows the initial position of collected particle cluster before manipulation, and the final position after manipulation to a new location. Both 1 μm and 2 μm sized particles were initially captured by illuminating the PNS and applying an AC electric signal of 10 KHz frequency as in FIG. 5A. When the AC frequency was increased from 10 KHz to 25 KHz, the initially captured 2 μm particles were expelled from the aggregation; while the 1 μm particles still remained as shown in FIG. 5B.

100 nm polystyrene particles were used in order to ascertain if high throughput concentration of particles at this length scale can be achieved with the PNS. With either AC electric field or laser illumination applied, no particle concentration was observed. However, when an AC voltage of 19 Vpp, 50 KHz frequency and laser excitation was applied rapid particle concentration took place as shown in FIG. 6.

The aggregation could be translated from one location to another by moving the stage. Thus the PNS eliminates the requirement for highly focused illumination to drive particle transport and aggregation. This ability to achieve rapid particle concentration on the PNS with loosely focused optical illumination would benefit applications requiring handling of biological particles with high throughput with minimal risk of optical damage.

Accelerated Particle Capture Beyond Brownian Diffusion

Rapid particle transport and concentration is very critical for several applications. A key issue limiting the performance of biosensors including plasmonic sensors is diffusion-limited transport of analytes. For this purpose, dilute solution of 1 μm fluorescent polystyrene beads, were prepared by diluting the original solution to $10^7$ particles per ml, and the particles manually injected into the chip. While only laser illumination was applied on the chip, no particle capture was observed, even after 10 minutes. On applying AC signal of 21 Vpp amplitude, and 10 KHz frequency, electrothermal vortices where generated and particles several microns away where rapidly transported towards the illuminated area of the PNS. The rapid particle transport was compared with free diffusion.

The square of the distance moved by a particle towards the illuminated region (trapping site) was defined as:

$$R^2 = (x-x_0)^2 + (y-y_0)^2 \quad (6),$$

where $x_0$, and $y_0$ represent the initial particle coordinate position at the edge of the image window, and x and y represent the coordinate of the particle as it moves towards the trapping site. FIG. 7 depicts the trajectory of five 1 μm particles, which were transported from distances ranging from 130 μm to 220 μm away, and trapped in less than 12 seconds. The time it takes a particle to arrive at the aggregation site depends not only on the distance to be covered, but also on how fast the particles are moving. Particles closer to the surface of the PNS experience an opposing drag force that slows down their motion. The average rms diffusion distance is given by:

$$\langle R^2(t) \rangle = 2Dt \quad (7),$$

the diffusion coefficient $$D = k_B T / 3\pi \eta d \quad (8),$$

where D, $k_B$, d and η are the diffusion coefficient, Boltzmann constant, diameter of the sphere, and viscosity of the medium respectively.

At a temperature T=353 K, the viscosity of water η=3.55× $10^{-4}$ Pa was used to compute the diffusion coefficient of 1.35 μm²/s. It would take over four hours for a 1 μm particle to diffuse through this distance by free diffusion, which would limit the response time of plasmonic biosensors. Embodiments of the present disclosure enables over three orders of magnitude faster transport and concentration of particles on the PNS, and would undoubtedly improve significantly the response time of LSPR biosensors, and enable other Lab-on-a-chip applications.

Plasmonically-enhanced electrothermal microfluidic vortices may be an alternative approach for light-driven fluid motion in plasmonic-based optofluidic systems and demonstrated fluid velocities over 45 µm/s. This fluid motion mechanism requires both the simultaneous presence of light-induced heating of the nanostructures as well as an external AC electric field. This approach also makes it possible to preclude fluid motion from interfering from optical experiments, which is attractive for opto-fluidics.

Furthermore, the collective heating of plasmonic nanoparticles excited at near-resonance may achieve dynamic manipulation, sorting, translation and patterning of micro and nanoscale particles. The approach clearly shows particle trapping and manipulation driven by non-radiative energy decay from photo-stimulated nanoparticle array, to address the issue of particle transport across large distances on a plasmonic substrate. Additionally, concentration of nanoscale objects may be obtained with loosely focused illumination 10×, 0.25 NA objective.

Due to the low optical intensity, the scheme thus drastically reduces the risk of optical damage or opticution. This approach of particle concentration, and sorting on a PNS is very robust and insensitive to laser intensity variation, unlike other designs relying on thermofluidic forces whereby a variation of laser intensity above the threshold causes an imbalance of the delicate balance of forces, and particle trapping is mitigated. Additionally, our approach is ideally suited for biosensing due to the ability to rapidly sort, concentrate particles on a plasmonic substrate whereby the optical hot spots generated by stimulating the plasmonic nanostructures could be used for biological sensing purpose, and as hot spots for SERS. The local heating effect following resonant excitation of plasmonic nanoparticles is not deleterious for particle trapping applications as have been portrayed in the literature. This heating effect has been used to achieve rapid concentration, dynamic control, and sorting of particles, which is crucial for many lab-on-a-chip applications. This technique may be of benefit for a wide range of applications including bio-sensing and surface-enhanced spectroscopies.

Chip Fabrication

Gold nanodisks of 240 nm diameter may be fabricated on an ITO coated glass substrate (surface resistivity of 500 Ohm/Sq.) using Electron beam lithography (EBL). Approximately 120 nm of ZEP-520A resist may be spin-coated on the ITO-coated glass substrate. After writing, the resist may be developed for 2 minutes in ZED N50, rinsed with IPA, and dried under nitrogen. 3 nm Titanium film adhesion layer followed by 30 nm gold film may be deposited in an electron beam evaporation chamber. Metal lift-off was carried out by soaking in ZDMAC for 20 minutes, after which the chip was rinsed in IPA. Microfluidic chamber may be sandwiched between the electrode (with the EBL patterns) and another electrode made of un-patterned ITO-coated glass. The microfluidic chamber may be made from 90 µm thick double-sided adhesive tape, with the EBL patterns well-within the chamber. Contacts may be made for application of AC electric field on the ITO coated side of the substrates using adhesive copper tapes.

CONCLUSION

It is to be appreciated that the Detailed Description section, and not the Abstract section, is intended to be used to interpret the claims. The Abstract section may set forth one or more, but not all exemplary embodiments, of the present disclosure, and thus, are not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made without departing from the spirit and scope of the present disclosure. Thus the present disclosure should not be limited by any of the above-described exemplary embodiments, but should be defined only in accordance with the following claims and their equivalents.

What is claimed is:

1. A hybrid device for on-chip concentration of particles on a plasmonic substrate, comprising:
    a first substrate with a bottom portion coupled to a bottom portion of a microfluidic chamber that includes a fluidic medium, wherein the fluidic medium is configured to transport a plurality of particles located in the fluidic medium when an electrothermal force is generated within the fluidic medium;
    a second substrate with a bottom portion coupled to a top portion of the first substrate opposing the bottom portion of the first substrate that is non-uniform to generate a thermal gradient, wherein the thermal gradient is configured to generate the electrothermal force within the fluidic medium; and
    a third substrate with a bottom portion coupled to a top portion of the second substrate opposing the bottom portion of the second substrate and a top portion that includes an electrode that is configured to receive a laser beam that heats the electrode, wherein the heated electrode generates the thermal gradient in the second substrate that generates the electrothermal force within the fluidic medium to direct particles onto the plasmonic substrate.

2. The hybrid device of claim 1, wherein the non-uniformity of the second substrate is generated from a plurality of nanoparticles included in the second substrate.

3. The hybrid device of claim 2, wherein the second substrate is excited to a resonant frequency light from the laser beam to resonate the nanoparticles included in the second substrate, wherein the resonant excitation of the plasmonic nanoparticles absorb power which is converted to heat to generate the thermal gradient.

4. The hybrid device of claim 3, wherein the resonating nanoparticles are triggered into resonance by the laser beam that heats the electrode.

5. The hybrid device of claim 4, wherein the resonating nanoparticles are triggered into resonance by rapid electrokinetic patterning (REP).

6. The hybrid device of claim 1, wherein the particles are suspended in the fluidic medium until the electrothermal force propels the particles through the fluidic medium and onto the plasmonic substrate.

7. The hybrid device of claim 1, further comprising:
    a plurality of electrically conducting elements coupled to the top portion of the first substrate and the bottom portion of the third substrate and configured to conduct an alternating current (AC) electric field generated by a function generator to generate the electrothermal force included in the fluidic medium.

8. The hybrid device of claim 1, wherein a portion of the particles are propelled towards the plasmonic substrate when frequencies of the AC electric field are less than a critical frequency associated with the portion of the particles, wherein the critical frequency is the frequency that excites the portion of the particles so that the portion of the particles are trapped on the plasmonic substrate.

9. The hybrid device of claim 1, wherein the laser beam is configured to generate a Gaussian profile for the thermal gradient so that the thermal gradient is concentrated on selective portions of the third substrate.

10. The hybrid device of claim 1, wherein the selective portions of the third substrate are selected due to a lack of particles being directed to the selective portions of the first substrate as compared to other portions of the first substrate that have received sufficient particles.

11. A method for on-chip concentration of particles on a plasmonic substrate, comprising:
    (i) coupling a bottom portion of a first substrate to a bottom portion of a fluidic chamber that includes a fluidic medium;
    (ii) transporting a plurality of particles located in the fluidic medium when an electrothermal force is generated within the fluidic medium;
    (iii) coupling a bottom portion of a second substrate to a top portion of the first substrate opposing the bottom portion of the first substrate that is non-uniform to generate a thermal gradient;
    (iv) generating the thermal gradient to generate the electrothermal force within the fluidic medium;
    (v) coupling a bottom portion of a third substrate to a top portion of the second substrate opposing the bottom portion of the second substrate, wherein a top portion of the third substrate includes an electrode;
    (vi) receiving a laser beam by the top portion of the third substrate that includes the electrode; and
    (vii) generating the thermal gradient in the second substrate from the heated electrode that generates the electrothermal force within the fluidic medium to direct particles onto the plasmonic substrate.

12. The method of claim 11, wherein the non-uniformity of the second substrate is generated from a plurality of nanoparticles included in the second substrate.

13. The method of claim 12, further comprising:
    (viii) exciting the second substrate to a resonant frequency by light from the laser beam to resonate the nanoparticles included in the second substrate, wherein the resonant excition of the plasmonic nanoparticles absorb power which is converted to heat to generate the thermal gradient.

14. The method of claim 13, wherein the resonating nanoparticles are triggered into resonance by the laser beam that heats the electrode.

15. The method of claim 14, wherein the resonating nanoparticles are triggered into resonance by rapid electrokinetic patterning (REP).

16. The method of claim 11, wherein the particles are suspended in the fluidic medium until the electrothermal force propels the particles through the fluidic medium and onto the plasmonic substrate.

17. The method of claim 11, further comprising:
    (ix) coupling a plurality of electrically conducting elements to the top portion of the first substrate and the bottom portion of the third substrate; and
    (x) conducting an alternating current (AC) electric field generated through the plurality of electrically conducting elements from a function generator to generate the electrothermal force included in the fluidic medium.

18. The method of claim 11, further comprising:
    (xi) propelling a portion of the particles towards the plasmonic substrate when frequencies of the AC electric field are less than a critical frequency associated with the portion of the particles, wherein the critical frequency is the frequency that excites the portion of the particles so that the portion of the particles are trapped on the plasmonic substrate.

19. The method of claim 11, further comprising:
    (xii) generating a Gaussian profile from the thermal gradient so that the thermal gradient is concentrated on a plurality of selective portions of the third substrate.

20. The method of claim 11, further comprising:
    (xiii) selecting the plurality of selective portions of the third substrate is selected due to a lack of particles being directed to the selective portions of the third substrate as compared to other portions of the third substrate that have received a sufficient quantity of particles.

* * * * *